(12) United States Patent
Han

(10) Patent No.: US 11,575,820 B2
(45) Date of Patent: Feb. 7, 2023

(54) CAMERA MODULE

(71) Applicant: LG INNOTEK CO., LTD., Seoul (KR)

(72) Inventor: Sang Yeon Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/414,086

(22) PCT Filed: Jan. 8, 2020

(86) PCT No.: PCT/KR2020/000347
§ 371 (c)(1),
(2) Date: Jun. 15, 2021

(87) PCT Pub. No.: WO2020/153632
PCT Pub. Date: Jul. 30, 2020

(65) Prior Publication Data
US 2022/0070347 A1 Mar. 3, 2022

(30) Foreign Application Priority Data

Jan. 22, 2019 (KR) .................. 10-2019-0008324

(51) Int. Cl.
*H04N 5/225* (2006.01)
*G03B 5/00* (2021.01)
*G03B 13/36* (2021.01)

(52) U.S. Cl.
CPC ............ *H04N 5/2258* (2013.01); *G03B 5/00* (2013.01); *G03B 13/36* (2013.01); *H04N 5/2253* (2013.01); *H04N 5/2254* (2013.01); *H04N 5/2257* (2013.01); *G03B 2205/0007* (2013.01)

(58) Field of Classification Search
CPC .. H04N 5/2252; H04N 5/2254; H04N 5/2257; H04N 5/2258
See application file for complete search history.

(56) References Cited

U.S. PATENT DOCUMENTS

| | | |
|---|---|---|
| 2017/0082823 A1 | 3/2017 | Hwang et al. |
| 2017/0146771 A1 | 5/2017 | Ho et al. |
| 2018/0176351 A1 | 6/2018 | Wei et al. |
| 2018/0196219 A1 | 7/2018 | O et al. |

(Continued)

FOREIGN PATENT DOCUMENTS

| | | |
|---|---|---|
| CN | 106850882 A | 6/2017 |
| CN | 206294254 U | 6/2017 |

(Continued)

*Primary Examiner* — Paul M Berardesca
(74) *Attorney, Agent, or Firm* — Birch, Stewart, Kolasch & Birch, LLP

(57) ABSTRACT

Provided is a camera module. A camera module according to one aspect of the present invention comprises: a first bracket including a first hole; a second bracket which includes a first groove and which is connected to the first bracket; a first lens module arranged in the first hole of the first bracket; and a second lens module arranged in the first groove of the second bracket, wherein the second lens module is formed to be smaller than the first groove, and the second bracket has a first protrusion being extended inwardly from the inner side surface of the first groove so as to fix the position of the second lens module.

20 Claims, 11 Drawing Sheets

(56) References Cited

U.S. PATENT DOCUMENTS

| | | | |
|---|---|---|---|
| 2019/0064471 A1* | 2/2019 | Chang | G02B 7/04 |
| 2020/0292778 A1* | 9/2020 | Li | H04N 5/2258 |
| 2021/0075944 A1* | 3/2021 | Ding | H04N 5/2257 |
| 2021/0152717 A1* | 5/2021 | Tsuzaki | H05K 3/321 |

FOREIGN PATENT DOCUMENTS

| | | | | |
|---|---|---|---|---|
| CN | 107155028 A | * | 9/2017 | H04N 5/2251 |
| CN | 206741174 U | | 12/2017 | |
| CN | 108027493 A | | 5/2018 | |
| CN | 108270949 A | | 7/2018 | |
| CN | 110278363 A | * | 9/2019 | H04N 5/2251 |
| JP | 2009-75271 A | | 4/2009 | |
| KR | 10-2012-0063376 A | | 6/2012 | |
| KR | 10-2014-0133002 A | | 11/2014 | |
| KR | 10-2017-0002188 A | | 1/2017 | |
| KR | 10-2018-0023172 A | | 3/2018 | |
| KR | 10-2018-0102945 A | | 9/2018 | |
| WO | WO-2006093377 A1 | * | 9/2006 | G02B 7/021 |
| WO | WO 2017/148069 A1 | | 9/2017 | |
| WO | WO-2019232751 A1 | * | 12/2019 | G06F 1/1686 |

\* cited by examiner

CAMERA MODULE

CROSS REFERENCE TO RELATED APPLICATIONS

This application is the National Phase of PCT/KR2020/000347 filed on Jan. 8, 2020, which claims priority under 35 U.S.C. § 119(a) to Patent Application No. 10-2019-0008324 filed in the Republic of Korea on Jan. 22, 2019, all of which are hereby expressly incorporated by reference into the present application.

TECHNICAL FIELD

The present embodiment relates to a camera module.

BACKGROUND ART

The content described below provides background information on the present embodiment, and does not describe the prior art.

As various portable terminals are widely spread and commonly used, and the wireless Internet services have been commercialized, the demands of consumer related to portable terminals have been diversified and various kinds of additional devices have been installed in portable terminals.

Among them, there is a camera module for photographing a subject as a photograph or a moving picture. Meanwhile, recently, a dual camera module is being researched, and since the dual camera module allows each camera to photograph different parts and synthesize two photographed images into a single image so that it is possible to photograph images that cannot be filmed with an existing single camera module.

However, in the case of a dual camera module, there is a problem that a separate process is required to perform optical axis alignment between camera modules being coupled to the bracket.

DETAILED DESCRIPTION OF THE INVENTION

Technical Subject

The problem to be solved by the present invention is to provide a camera module capable of performing optical axis alignment between camera modules coupled to a bracket without a separate process.

Technical Solution

A camera module according to one aspect of the present invention for achieving the above object comprises: a first bracket comprising a first hole; a second bracket which comprises a first groove and which is connected to the first bracket; a first lens module disposed in the first hole of the first bracket; and a second lens module disposed in the first groove of the second bracket, wherein the second lens module is formed to be smaller than the first groove, and the second bracket has a first protrusion extending inwardly from the inner lateral surface of the first groove so as to fix the position of the second lens module.

In addition, the first bracket and the second bracket may be integrally formed.

In addition, the height of the second bracket may be formed lower than the height of the first bracket.

In addition, the first bracket may comprise a step portion formed between the first hole and an upper surface, and a second groove extending downward from the step portion.

In addition, a first coupling member disposed between the first lens module and the step portion and between the first lens module and the second groove may be comprised.

In addition, the first coupling member may be formed as a flowable liquid disposed between the first lens module and the first bracket is cured.

In addition, the height of the first protrusion may be formed smaller than the height of the first groove.

In addition, a second coupling member disposed between the upper surface of the first protrusion and the second lens module and the second bracket may be comprised.

In addition, a first substrate disposed under the first lens module and a first flexible substrate extending from the first substrate toward the outside of the first bracket are comprised wherein the first bracket may comprise a third groove formed at a lower portion of a lateral surface and penetrated by the first flexible substrate.

In addition, the first substrate may comprise a second protrusion formed on a lateral surface, and the first bracket may comprise a fourth groove formed in the first hole and corresponding to the second protrusion.

In addition, the second bracket comprises a bottom surface and first to third lateral walls extending upward from an edge of the bottom surface, and the first protrusion may be formed on an inner lateral surface of each of the first to third lateral walls.

In addition, the protrusion may be formed by extending from a central region of an inner lateral surface of each of the first to third lateral walls toward the vertical direction.

In addition, a second substrate disposed between the second lens module and the bottom surface of the second bracket may be comprised, and a lateral surface of the second substrate may comprise a fifth groove corresponding to the first protrusion.

In addition, the size of the second substrate may correspond to the size of the first groove.

In addition, a second substrate disposed below the second lens module is comprised, and the second lens module may comprise a sixth groove formed on a lower surface thereof.

In addition, the second lens module comprises a protrusion protruding downward from an edge region of a lower surface, the sixth groove is formed on a lower surface of the protrusion, and the sixth groove may be formed in a strip shape.

In addition, the sixth groove may comprise a straight portion formed in a strip shape and a circular portion formed in a corner region of the straight portion.

In addition, the first lens module is inserted into the first hole from below the first bracket, and the second lens module may be inserted into the first groove from above the second bracket.

The camera module according to the present embodiment comprises: a first bracket comprising a first hole; a second bracket comprising a first groove and fixed to the first bracket; a first lens module disposed in the first hole of the first bracket; and a second lens module disposed in the first groove of the second bracket, wherein the first hole penetrates the first bracket in the optical axis direction of the first lens module, wherein one of the plurality of lateral walls of the second bracket is opened so that the first groove is opened in a first direction perpendicular to the optical axis direction, wherein the size of the second lens module in the direction of the optical axis and in a second direction perpendicular to the first direction is formed to be smaller than the size of the first groove in a corresponding direction, and wherein the second bracket may comprise a first protrusion protruding from an inner surface of one or more of the plurality of lateral walls to be in contact with the second lens module.

Advantageous Effects

Through this embodiment, it is possible to provide a camera module capable of performing optical axis alignment between camera modules coupled to a bracket without a separate process.

BEST MODE

Figure 1:
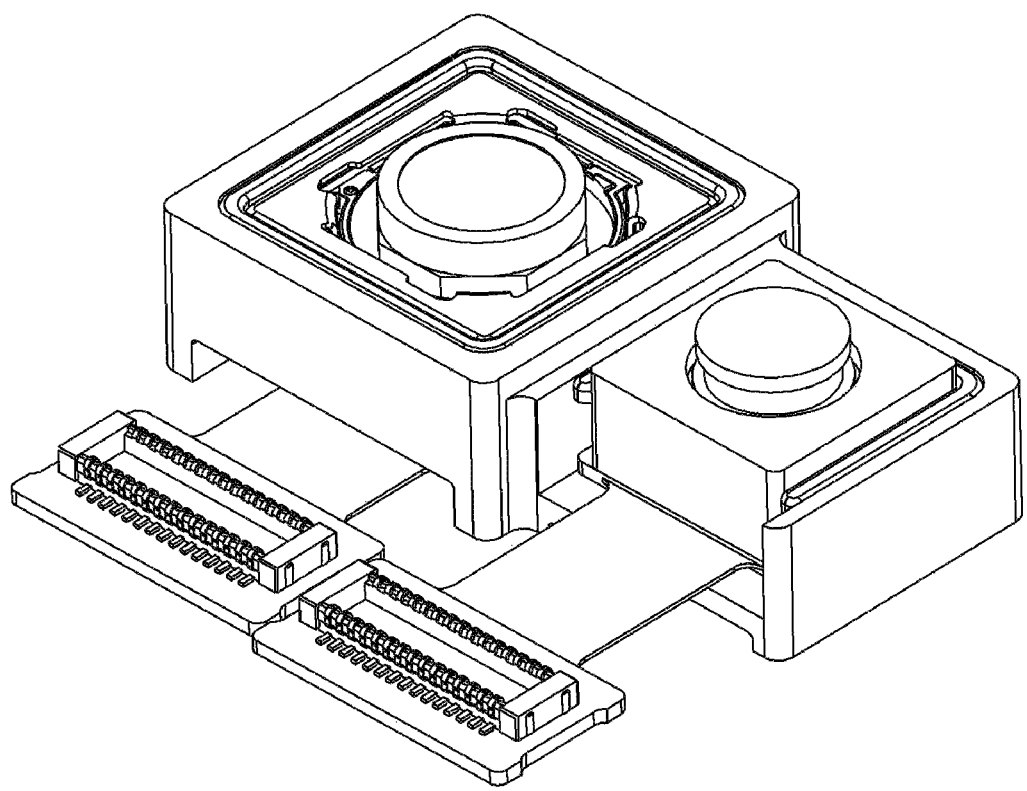
FIG. 1 is a perspective view of a camera module according to an embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

The 'optical axis direction' used below is defined as the optical axis direction of a lens and/or image sensor coupled to the lens driving apparatus. Meanwhile, the 'optical axis direction' may correspond to an 'up-down direction', a 'z-axis direction', and the like.

A camera module 10 according to an embodiment of the present invention may comprise a dual camera module. The camera module 10 may be mounted on an optical device. Optical devices may comprise cell phones, mobile phones, smart phones, portable smart devices, digital cameras, laptop computers, digital broadcasting terminals, personal digital assistants (PDAs), portable multimedia players (PMPs), and navigation. However, the type of optical device is not limited thereto, and any device for photographing an image or picture may be comprised in the optical device.

The optical device may comprise a main body. The main body can form the outer appearance of an optical device. The main body may accommodate the camera module 10. A display unit may be disposed on one surface of the main body. For example, the display unit and the camera module 10 may be disposed on one surface of the main body, and the camera module 10 may be additionally disposed on the other surface of the main body (a surface located on the opposite side of the main body).

The optical device may comprise a display unit. The display unit may be disposed on one surface of the main body. The display unit may output an image photographed by the camera module 10.

The camera module 10 may comprise a first camera module and a second camera module. The first camera module may comprise a first lens module 1200, a first substrate 1300, a first flexible substrate 1400, and a first connector 1500. The second camera module may comprise a second lens module 2200, a second substrate 2300, a second flexible substrate 2400, and a second connector 2500.

Each of the first camera module and the second camera module according to an embodiment of the present invention may comprise a first actuator performing an auto focus function and a second actuator performing a hand shake correction function.

The auto focus function may mean a function that automatically focuses on a subject by moving the lens in the direction of the optical axis according to the distance of the subject so that clear images of the subject can be obtained on the image sensor. Meanwhile, 'auto focus' can be used interchangeably with 'Auto Focus (AF)'.

The hand shake correction function may mean a function of moving or tilting a lens module in a direction perpendicular to the optical axis direction so as to cancel a vibration (movement) generated in an image sensor by an external force. Meanwhile, the 'hand shake correction' may be used interchangeably with 'optical image stabilization (OIS)'.

Before coupling the first camera module and the second camera module to the first and second brackets 1100 and 2100, an optical axis alignment that aligns the optical axis of the first lens module 1200 of the first camera module and the optical axis of the image sensor of the first substrate 1300, and an optical axis alignment to align the optical axis of the second lens module 2200 of the second camera module and the optical axis of the image sensor of the second substrate 2300 may be proceeded, respectively.

Hereinafter, the present invention will be described in more detail with reference to the accompanying drawings.

Figure 2:
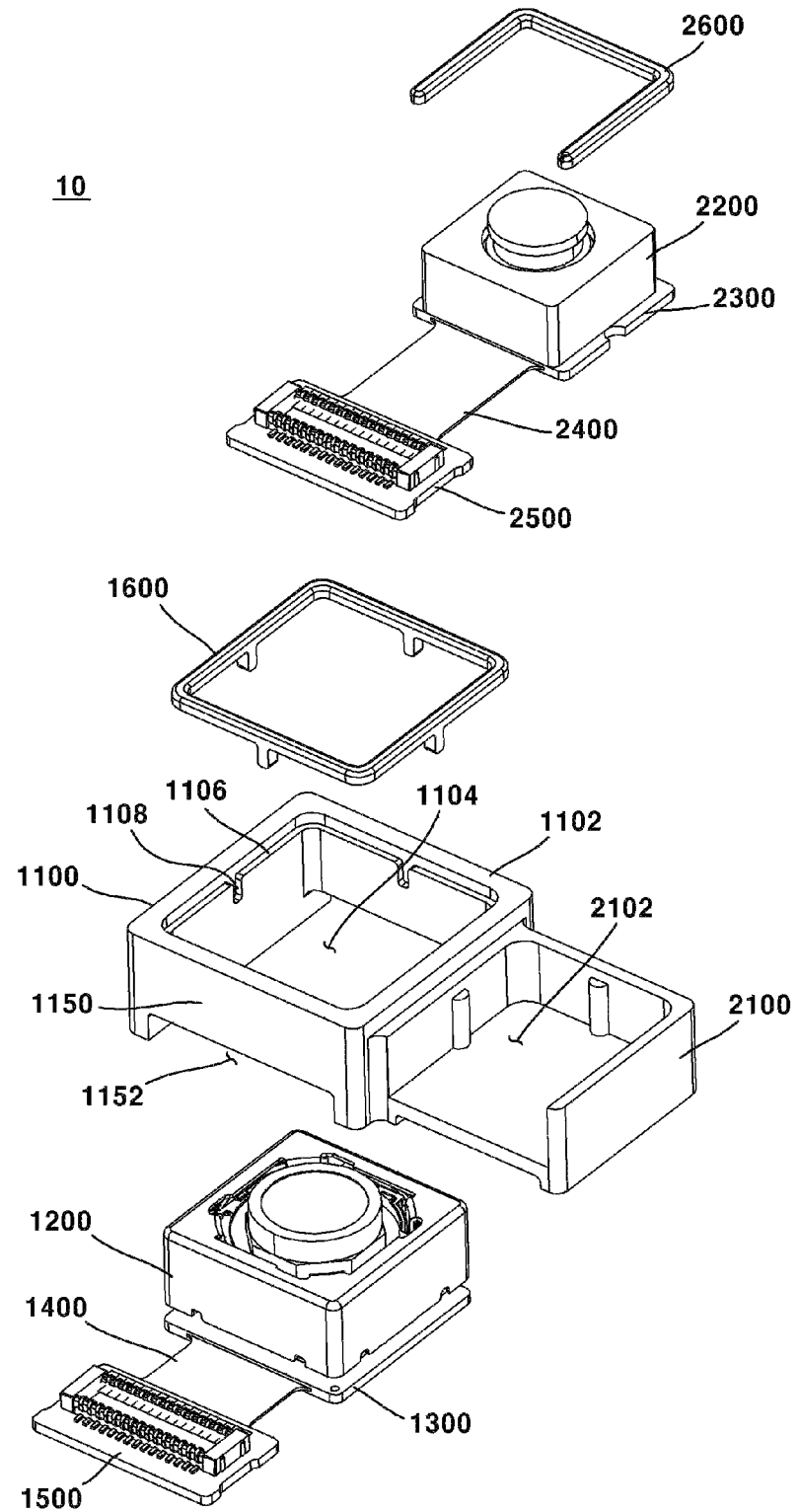
FIG. 2 is an exploded perspective view of a camera module according to an embodiment of the present invention.
Figure 3:
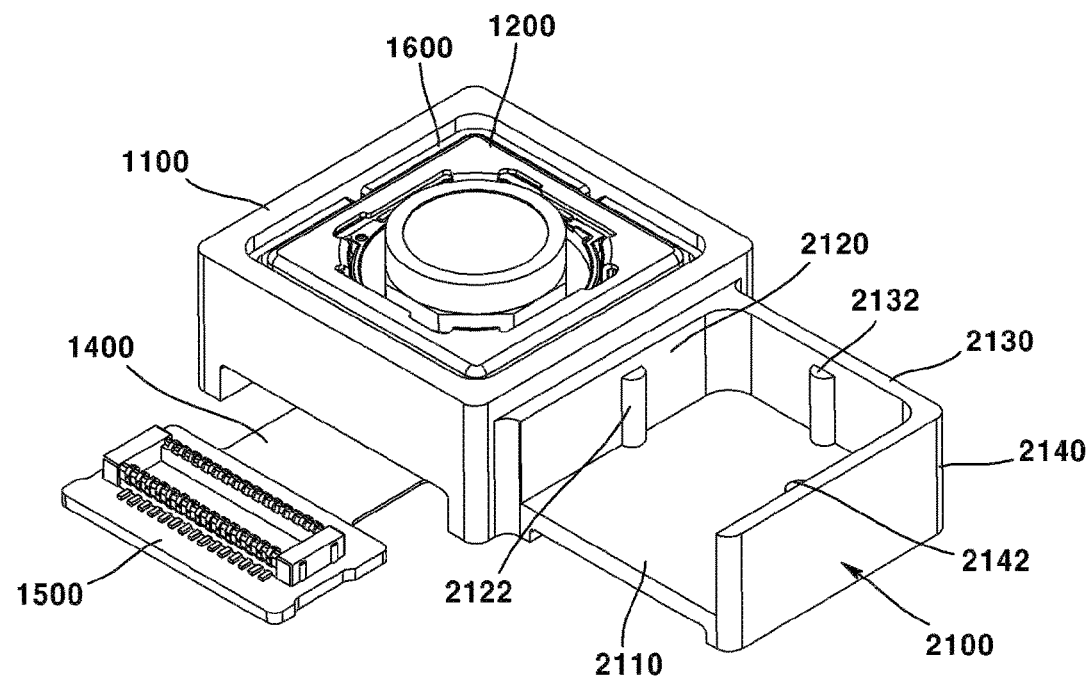
FIGS. 3 and 4 are perspective views of a partial configuration of a camera module according to an embodiment of the present invention.
Figure 4:
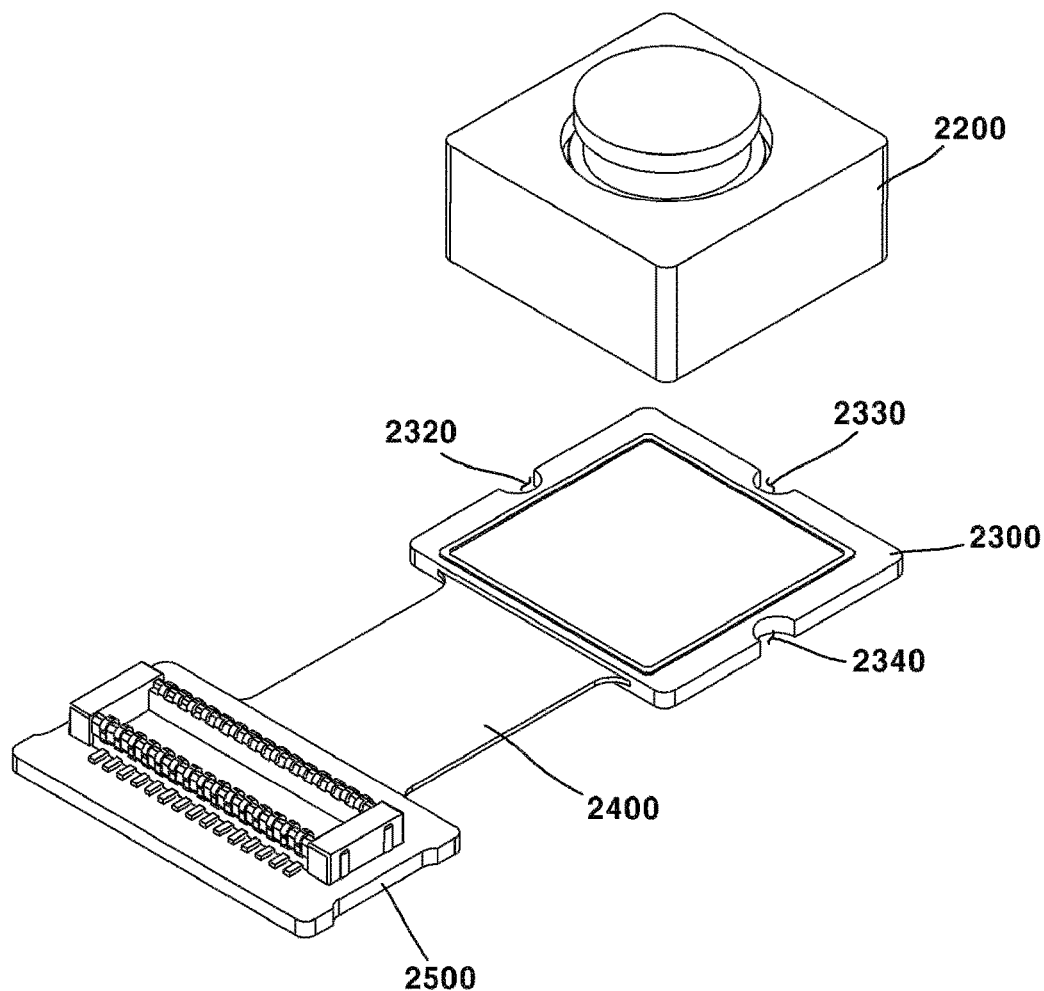
Figure 5:
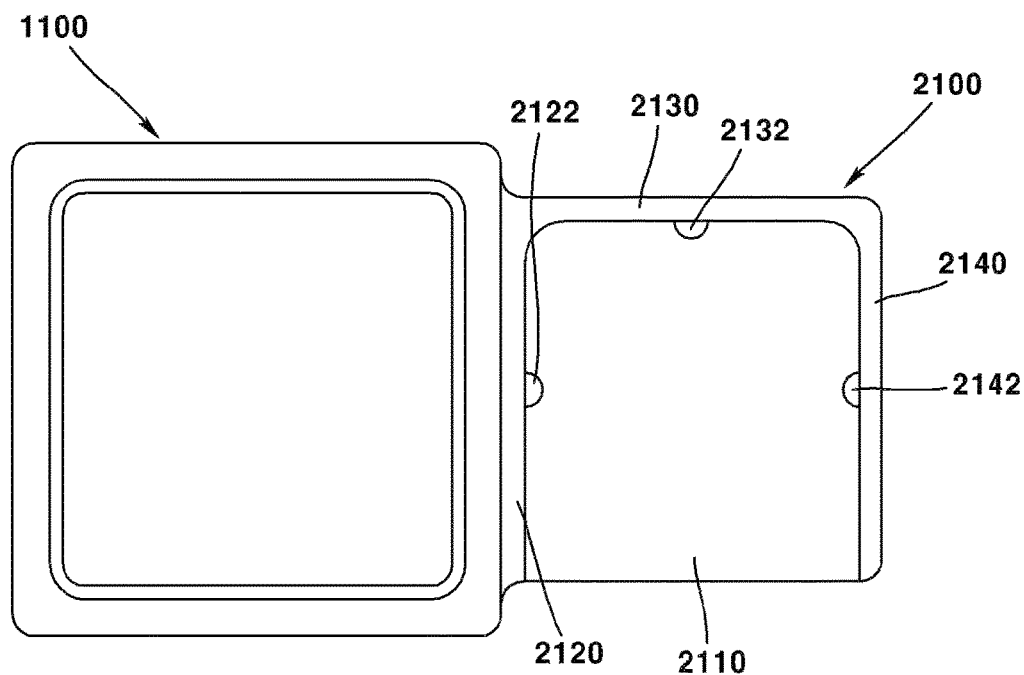
FIGS. 5 and 6 are plan views of a partial configuration of a camera module according to an embodiment of the present invention.
Figure 6:
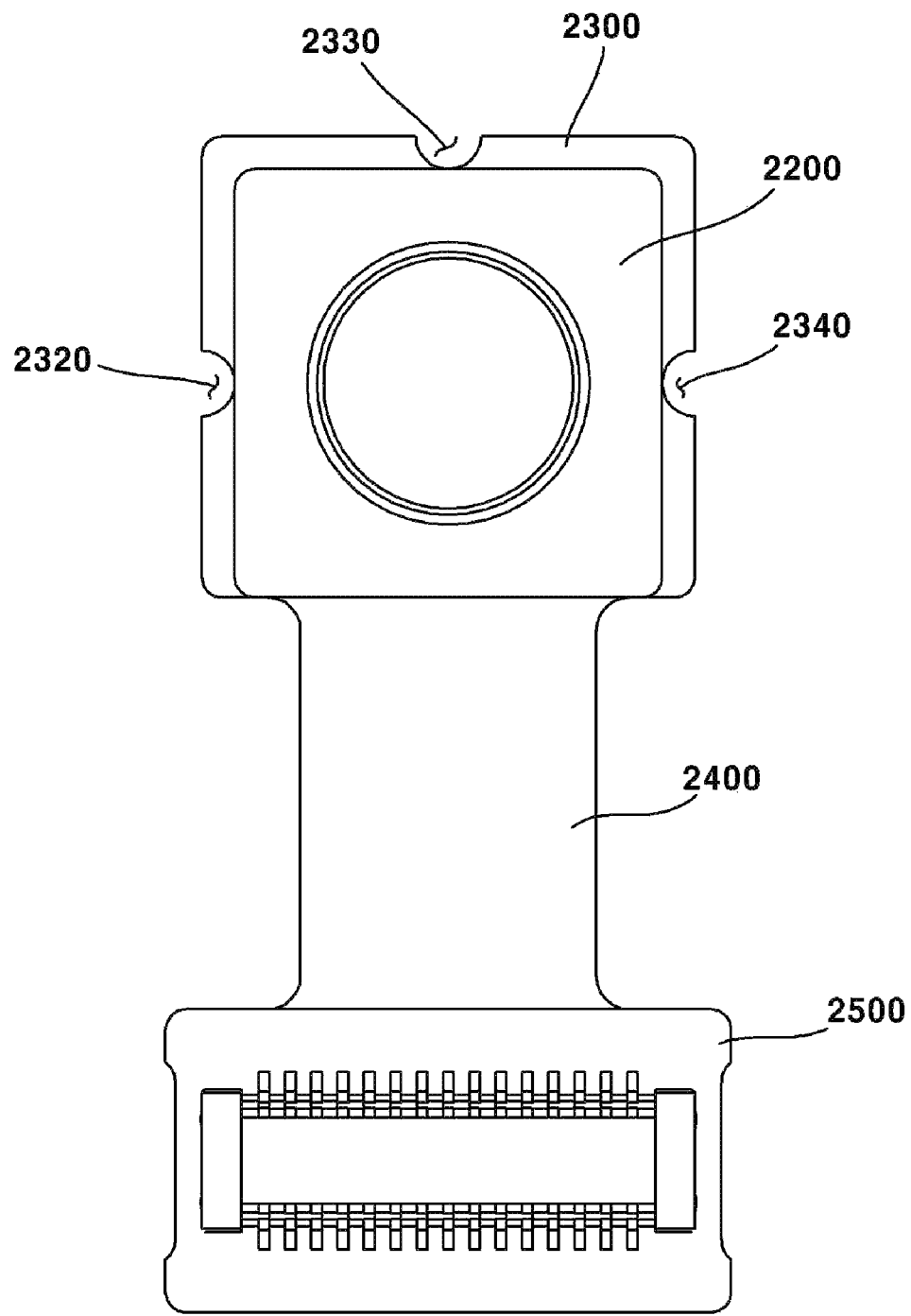
Figure 7:
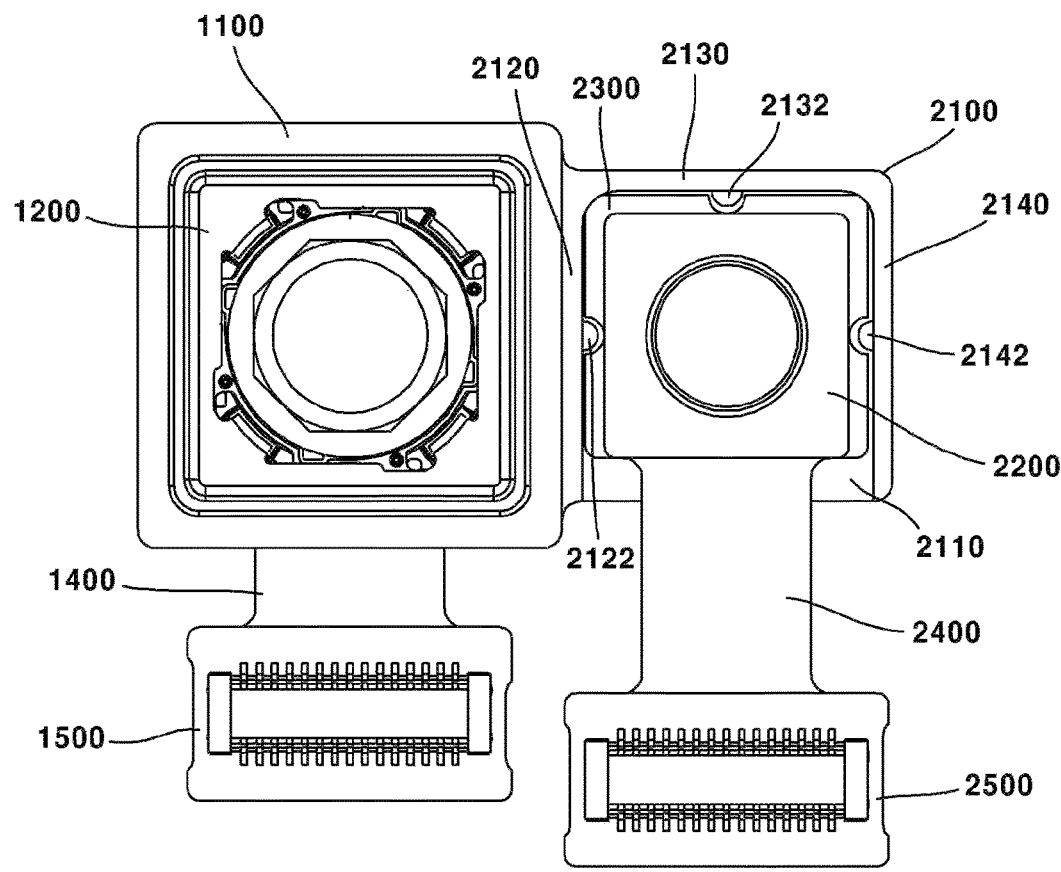
FIG. 7 is a plan view of a camera module according to an embodiment of the present invention.
Figure 8:
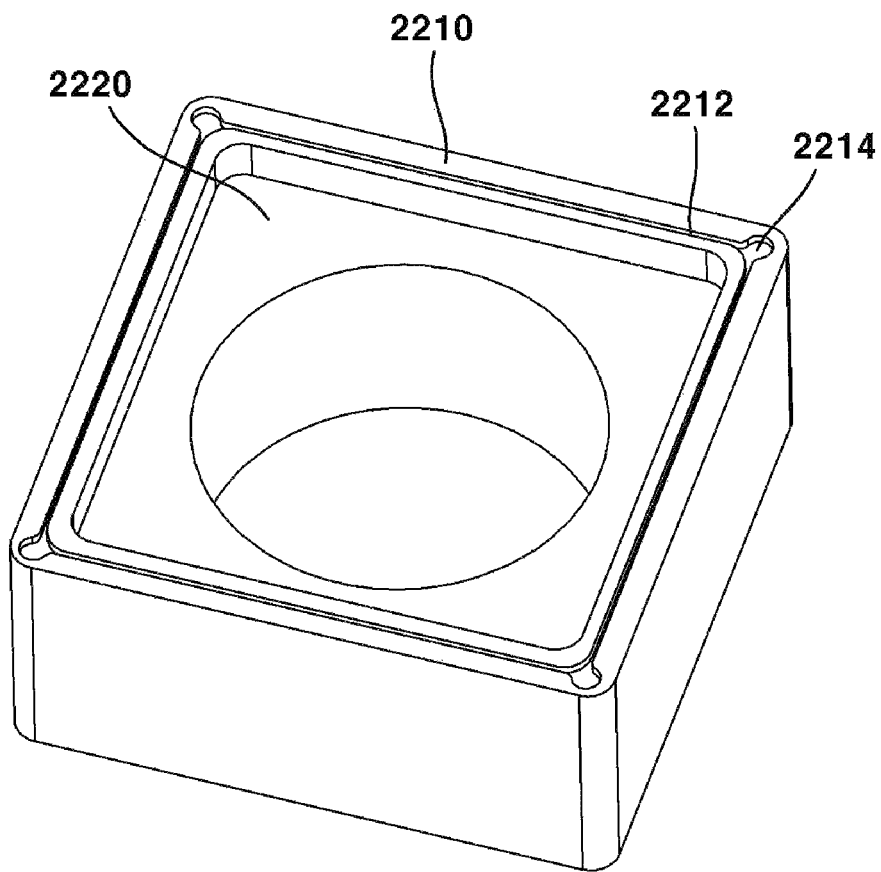
FIG. 8 is a perspective view of a partial configuration of a camera module according to an embodiment of the present invention.

FIG. 1 is a perspective view of a camera module according to an embodiment of the present invention. FIG. 2 is an exploded perspective view of a camera module according to an embodiment of the present invention. FIGS. 3 and 4 are perspective views of a partial configuration of a camera module according to an embodiment of the present invention. FIGS. 5 and 6 are plan views of a partial configuration of a camera module according to an embodiment of the present invention. FIG. 7 is a plan view of a camera module according to an embodiment of the present invention. FIG. 8 is a perspective view of a partial configuration of a camera module according to an embodiment of the present invention.

The camera module 10 may comprise a first bracket 1100. The first bracket 1100 may be connected to the second bracket 2100. The first bracket 1100 may be disposed in the horizontal direction of the second bracket 2100. The first bracket 1100 may be integrally formed with the second bracket 2100. The height of the first bracket 1100 may be formed to be greater than the height of the second bracket 2100.

The first bracket 1100 may comprise a first hole 1104. The first lens module 1200 may be disposed in the first hole 1104 of the first bracket 1100. The size of the first hole 1104 may be formed to correspond to the size of the first lens module 1200. The first hole 1104 may be formed in an area other than the edge area of the first bracket 1100. The first hole 1104 may be formed in a rectangular column shape.

The first bracket 1100 may comprise a step portion 1106 and a second groove 1108. The step portion 1106 may be formed between the first hole 1104 and an upper surface 1102 of the first bracket 1100. The step portion 1106 may be disposed below the upper surface 1102 of the first bracket 1100. The step portion 1106 may be formed in a rectangular strip shape. The second groove 1108 may be formed in the step portion 1106. The second groove 1108 may be formed by extending in a vertical direction. The second groove 1108 may be formed to be concave outward from the inner lateral surface of the first bracket 1100. The second groove 1108 may be formed in the central region of the step portion 1106. The second groove 1108 may comprise four second grooves 1108. The four second grooves 1108 may be spaced apart from each other. Each of the four second grooves 1108 may be disposed on each side of the step portion 1106. The four second grooves 1108 may be formed at positions symmetrical to each other with respect to the optical axis of the first lens module 1200. A first coupling member 1600 may be disposed in a space between the step portion 1106 and the first lens module 1200. A first coupling member 1600 may be disposed in a space between the second groove 1108 and the first lens module 1200.

The first bracket 1100 may comprise a third groove 1152. The third groove 1152 may be formed in a lower portion of a lateral surface 1150 of the first bracket 1100. The third groove 1152 may be formed larger than a cross section of the first flexible substrate 1400. The third groove 1152 may be penetrated by the first flexible substrate 1400. The third groove 1152 may be formed in a lateral surface 1150 positioned in a first direction of the first bracket 1100. In this case, the lateral surface 1150 may be a lateral wall.

The camera module 10 may comprise a first lens module 1200. The first lens module 1200 may be disposed on the first bracket 1100. The first lens module 1200 may be disposed in a first hole of the first bracket 1100. A lens may be disposed in the first lens module 1200. The size of the first lens module 1200 may be created to fit the size of the first hole 1104 of the first bracket 1100. The first lens module 1200 may be formed in a rectangular column shape. A first substrate 1300 may be disposed below the first lens module 1200. The optical axis of the lens of the first lens module 1200 may be aligned with the optical axis of the image sensor of the first substrate 1300.

The camera module 10 may comprise a first substrate 1300. The first substrate 1300 may be disposed below the first lens module 1200. The first substrate 1300 may be disposed in the first bracket 1100. The first substrate 1300 may be disposed in the first hole 1104 of the first bracket 1100. An image sensor may be disposed on an upper surface of the first substrate 1300. The optical axis of the image sensor of the first substrate 1300 may be aligned with the optical axis of the lens of the first lens module 1200. The first substrate 1300 may be electrically connected to the first flexible substrate 1400. In an embodiment of the present invention, the first substrate 1300 may comprise a printed circuit board, but is not limited thereto.

The camera module 10 may comprise a first flexible substrate 1400. The first flexible substrate 1400 may be electrically connected to the first substrate 1300. The first flexible substrate 1400 may be electrically connected to the second connector 2500. One side of the first flexible substrate 1400 may be connected to the first substrate 1300 and the other side may be connected to the first connector 1500. The first flexible substrate 1400 may penetrate the third groove 1152 of the first bracket 1100. The first flexible substrate 1400 may be formed to be extended from the first substrate 1300 toward the outside of the first bracket 1100. The first flexible substrate 1400 may comprise a flexible printed circuit board, but is not limited thereto.

The camera module 10 may comprise a first connector 1500. The first connector 1500 may be disposed outside the first bracket 1100. The first connector 1500 may be electrically connected to the first flexible substrate 1400. The first connector 1500 may supply external power and/or current to the first substrate 1300 disposed inside the first bracket 1100. The first connector 1500 may comprise a connector commonly used in the technical field of the present invention.

The camera module 10 may comprise a first coupling member 1600. The first coupling member 1600 may fix the first lens module 1200 to the first bracket 1100. The first coupling member 1600 may be disposed between the first lens module 1200 and the step portion 1106 of the first bracket 1100. The first coupling member 1600 may be disposed between the first lens module 1200 and the second groove 1108 of the first bracket 1100. The first coupling member 1600 may be formed by curing a flowable liquid placed between the first lens module 1200 and the first bracket 1100. Here, the flowable liquid forming the first coupling member 1600 may contain epoxy or the like.

The camera module 10 may comprise a second bracket 2100. The second bracket 2100 may be connected to the first bracket 1100. The second bracket 2100 may be disposed in a horizontal direction of the first bracket 1100. The second bracket 2100 may be integrally formed with the first bracket 1100. The height of the second bracket 2100 may be formed smaller than the height of the first bracket 1100.

The second bracket 2100 may comprise a bottom surface 2110 and first to third lateral walls 2120, 2130, and 2140. The bottom surface 2110 may be formed in a square plate shape. The first to third lateral walls 2120, 2130, and 2140 may be formed to be extended upward from the edge area of the bottom surface 2110, respectively. The first lateral wall 2120 may face the first bracket 1100. The first lateral wall 2120 may be connected to the first bracket 1100. The third lateral wall 2140 may face the first lateral wall 2120. The second lateral wall 2130 may connect the first lateral wall 2120 and the third lateral wall 2140. The second lateral wall 2130 may be located in a direction opposite to the first direction from the optical axis of the second lens module 2200. First protrusions 2122, 2132, and 2142 may be disposed on inner lateral surfaces of the first to third lateral walls 2120, 2130, and 2140. A space formed between the bottom surface 2110 of the second bracket 2100 and the first to third lateral walls 2120, 2130, and 2140 may be a first groove 2102.

The second bracket 2100 may comprise a first groove 2102. The second lens module 2200 may be disposed in the first groove 2102 of the second bracket 2100. The size of the first groove 2102 may be larger than the size of the second lens module 2200. The size of the first groove 2102 may be formed to correspond to the size of the second substrate 2300. The first groove 2102 may be formed to be concave downward from an upper surface of the second bracket 2100.

The second bracket 2100 may comprise first protrusions 2122, 2132, and 2142. The first protrusions 2122, 2132, and 2142 may be formed by extending inward from the inner lateral surface of the first groove 2102. The first protrusions 2122, 2132, and 2142 may be formed to be extended in a vertical direction from the inner lateral surface of the first groove 2102. The heights of the first protrusions 2122, 2132, and 2142 may be formed lower than the height of the first groove 2102. Cross-sections of the first protrusions 2122, 2132, and 2142 may be formed in a semicircular shape. The first protrusions 2122, 2132, and 2142 may position and fix the second lens module 2200 so that the second lens module 2200 disposed in the first groove 2102 is disposed in a predetermined area. The first protrusions 2122, 2132, and 2142 may comprise three first protrusions 2122, 2132, and 2142. The three first protrusions 2122, 2132, and 2142 may be disposed on inner lateral surfaces of the first to third lateral walls 2120, 2130, and 2140 of the second bracket 2100, respectively. The three first protrusions 2122, 2132, and 2142 may be spaced apart from one another. The three first protrusions 2122, 2132, and 2142 may be formed in a central region of the first to third lateral walls 2120, 2130, and 2140, respectively. The second coupling member 2600 may be disposed in a space between the upper surfaces of the first protrusions 2122, 2132, and 2142 and between the second lens module 2200 and the second bracket 2100. The shapes of the first protrusions 2122, 2132, and 2142 may be formed to correspond to the shapes of the fifth grooves 2320, 2330, and 2340.

The camera module 10 may comprise a second lens module 2200. The second lens module 2200 may be disposed in the second bracket 2100. The second lens module 2200 may be disposed in the first groove 2102 of the second bracket 2100. The size of the second lens module 2200 may be formed smaller than the size of the first groove 2102. The size and height of the second lens module 2200 may be smaller than the size and height of the first lens module 1200. The second lens module 2200 may be formed in a rectangular column shape. A second substrate 2300 may be disposed below the second lens module 2200. The optical axis of the lens of the second lens module 2200 may be aligned with the optical axis of the image sensor of the second substrate 2300.

The second lens module 2200 may comprise sixth grooves 2212 and 2214. The sixth grooves 2212 and 2214 may be formed in a lower surface 2220 of the second lens module 2200. The sixth grooves 2212 and 2214 may be formed in a lower surface of a protrusion 2210 protruding downward from an edge area of the lower surface 2220 of the second lens module 2200. The protrusion 2210 may be formed in a strip shape. The protrusion 2210 may in contact with an upper surface of the second substrate 2300. The sixth grooves 2212 and 2214 may be formed in a strip shape. The sixth grooves 2212 and 2214 may be formed in a central region of the protrusion 2210. The sixth grooves 2212 and 2214 may comprise a straight portion 2212 formed in a strip shape and a circular portion 2214 formed in a corner region of the straight portion 2212. When the lower portion of the second lens module 2200 is adhered to an upper portion of the second substrate 2300 using an epoxy or the like, the sixth grooves 2212 and 2214 provide a space through which an adhesive material such as epoxy can flow. At the same time, it is possible to prevent an adhesive material such as epoxy from entering into the image sensor disposed on an upper surface of the second substrate 2300. In the embodiment of the present invention, the protrusion 2210 and the sixth grooves 2212 and 2214 have been described as being formed in the second lens module 2200, but may be formed in the first lens module 1200.

The camera module 10 may comprise a second substrate 2300. The second substrate 2300 may be disposed below the second lens module 2200. The second substrate 2300 may be disposed inside the second bracket 2100. The second substrate 2300 may be disposed in the first groove 2102 of the second bracket 2100. The second substrate 2300 may be disposed between the bottom surface 2110 of the second bracket 2100 and the second lens module 2200. The size of the second substrate 2300 may correspond to the size of the first groove 2102 of the first bracket 1100. An image sensor may be disposed on an upper surface of the second substrate 2300. The optical axis of the image sensor of the second substrate 2300 may be aligned with the optical axis of the lens of the second lens module 2200. The second substrate 2300 may be electrically connected to the second flexible substrate 2400. In an embodiment of the present invention, the second substrate 2300 may comprise a printed circuit board, but is not limited thereto.

The second substrate 2300 may comprise fifth grooves 2320, 2330, and 2340. The fifth grooves 2320, 2330, and 2340 may be formed on lateral surfaces of the second substrate 2300. The fifth grooves 2320, 2330, and 2340 may be formed in a number and shape corresponding to the first protrusions 2122, 2132, and 2142. The fifth grooves 2320, 2330, and 2340 may be formed in a central region on a lateral surface of the second substrate 2300. The fifth grooves 2320, 2330, and 2340 may be formed in a semicircular shape. First protrusions 2122, 2132, and 2142 may be inserted into the fifth grooves 2320, 2330, and 2340. Through this, the position of the second substrate 2300 with respect to the second bracket 2100 may be guided. The fifth grooves 2320, 2330, and 2340 may comprise three fifth grooves 2320, 2330, and 2340. The three fifth grooves 2320, 2330, and 2340 may be spaced apart from one another. The three fifth grooves 2320, 2330, and 2340 may be formed in lateral surfaces of the second substrate 2300 except for a lateral surface in the first direction.

The camera module 10 may comprise a second flexible substrate 2400. The second flexible substrate 2400 may be electrically connected to the second substrate 2300. The second flexible substrate 2400 may be electrically connected to the second connector 2500. One side of the second flexible substrate 2400 may be connected to the second substrate 2300 and the other side may be connected to the second connector 2500. The second flexible substrate 2400 may be formed to be extended from the second substrate 2300 toward the outside of the first bracket 1100. The second flexible substrate 2400 may be extended from the second substrate 2300 in a first direction without the first to third lateral walls 2120, 2130, and 2140. The second flexible substrate 2400 may comprise a flexible printed circuit board, but is not limited thereto.

The camera module 10 may comprise a second connector 2500. The second connector 2500 may be disposed outside the second bracket 2100. The second connector 2500 may be electrically connected to the second flexible substrate 2400. The second connector 2500 may supply external power and/or current to the second substrate 2300 disposed in the second bracket 2100. The second connector 2500 may comprise a connector commonly used in the technical field of the present invention.

The camera module 10 may comprise a second coupling member 2600. The second coupling member 2600 may be disposed between an upper portion of the second bracket 2100 and an upper portion of the second lens module 2200. The second coupling member 2600 may be disposed on upper surfaces of the first protrusions 2122, 2132, and 2142. The second coupling member 2600 may be disposed between top surfaces of the first protrusions 2122, 2132, and 2142, the second lens module 2200, and the second bracket 2100. The second coupling member 2600 may be formed in a 'C' shape. The second coupling member 2600 may be formed by curing a flowable liquid placed between the second lens module 2200 and the second bracket 2100. Here, the flowable liquid forming the second coupling member 2600 may comprise epoxy or the like.

In an embodiment of the present invention, although it is explained in that the first lens module 1200 is inserted into the first hole 1104 from below the first bracket 1100, and the second lens module 2200 is inserted into the first groove 2102 from above the second bracket 2100, but the description is not limited thereto, and the insertion directions of the first and second lens modules 1200 and 2200 may be variously changed.

In this embodiment, the first hole 1104 may penetrate the first bracket 1100 in the optical axis direction of the first lens module 1200. One of the plurality of lateral walls of the second bracket 2100 may be opened so that the first groove 2102 thereof is opened in a first direction perpendicular to the optical axis direction. The size of the second lens module 2200 in the direction of the optical axis and in a second direction perpendicular to the first direction may be smaller than the size of the first groove 2102 in a corresponding direction. The second bracket 2100 may comprise first protrusions 2122, 2132, and 2142 protruding from an inner surface of at least one of the plurality of lateral walls and being in contact with the second lens module 2200.

Hereinafter, a camera module 10 according to another embodiment of the present invention will be described with reference to FIGS. 9 to 11. A description of the same configuration as the camera module 10 according to an embodiment of the present invention will be omitted.

Figure 9:
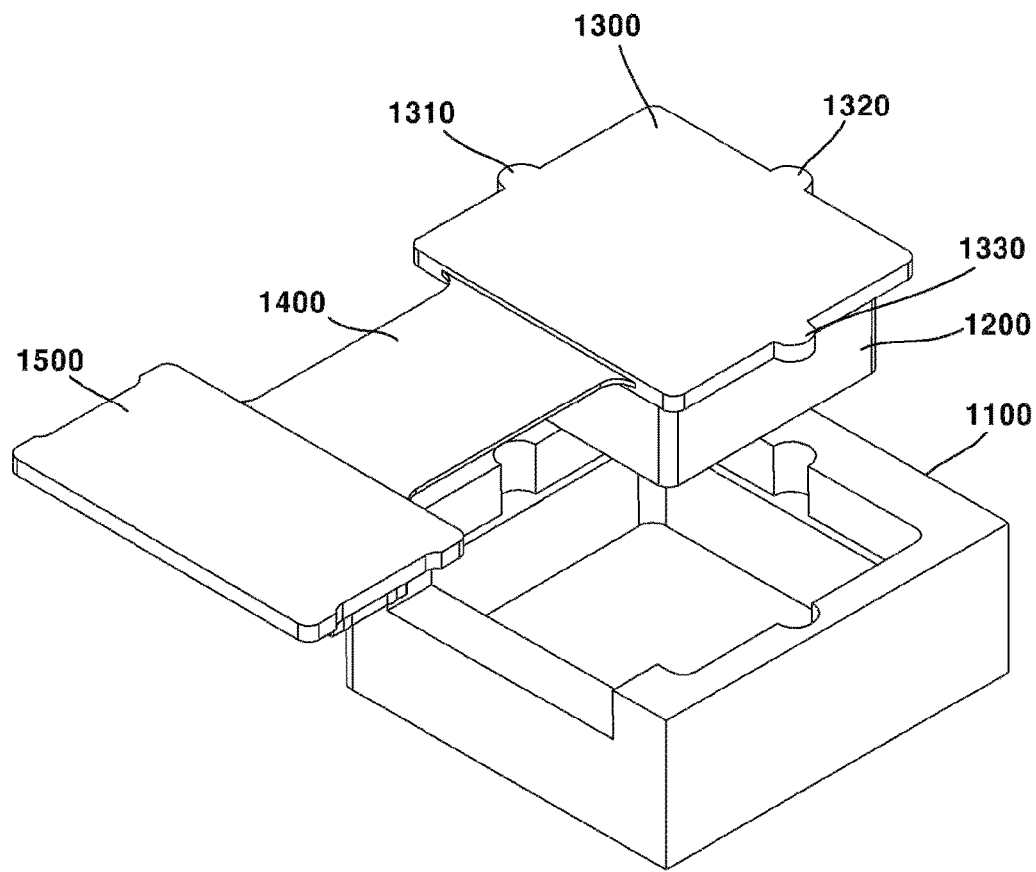
FIGS. 9 to 11 are perspective views of a partial configuration of a camera module according to another embodiment of the present invention.
Figure 10:
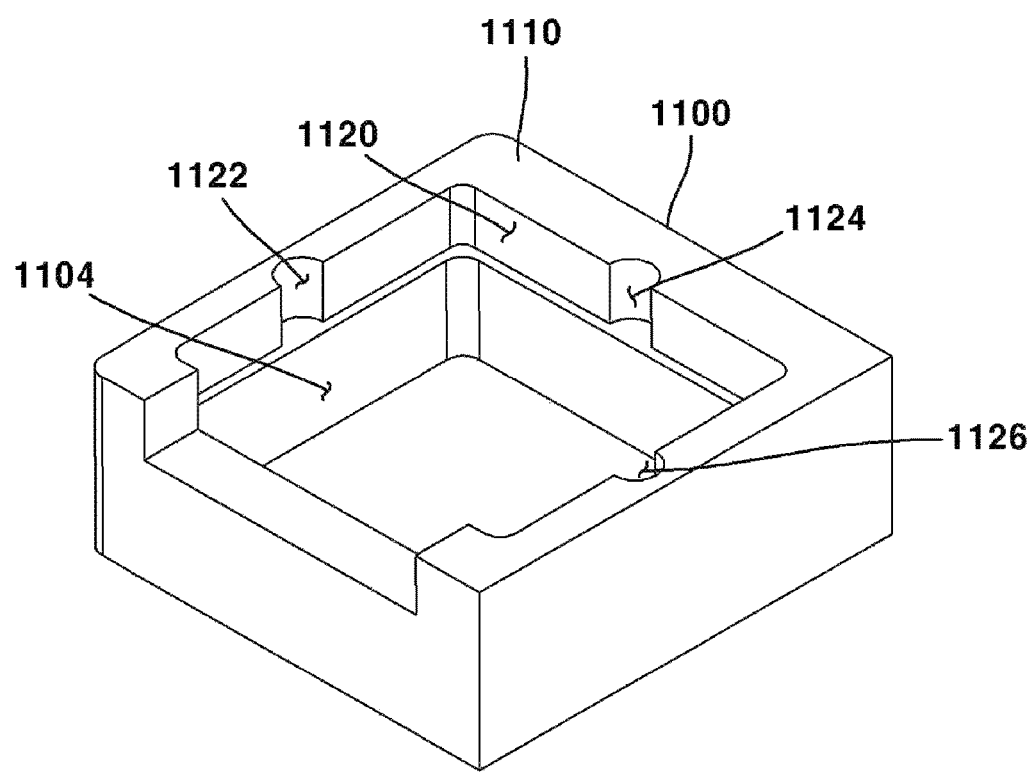
Figure 11:
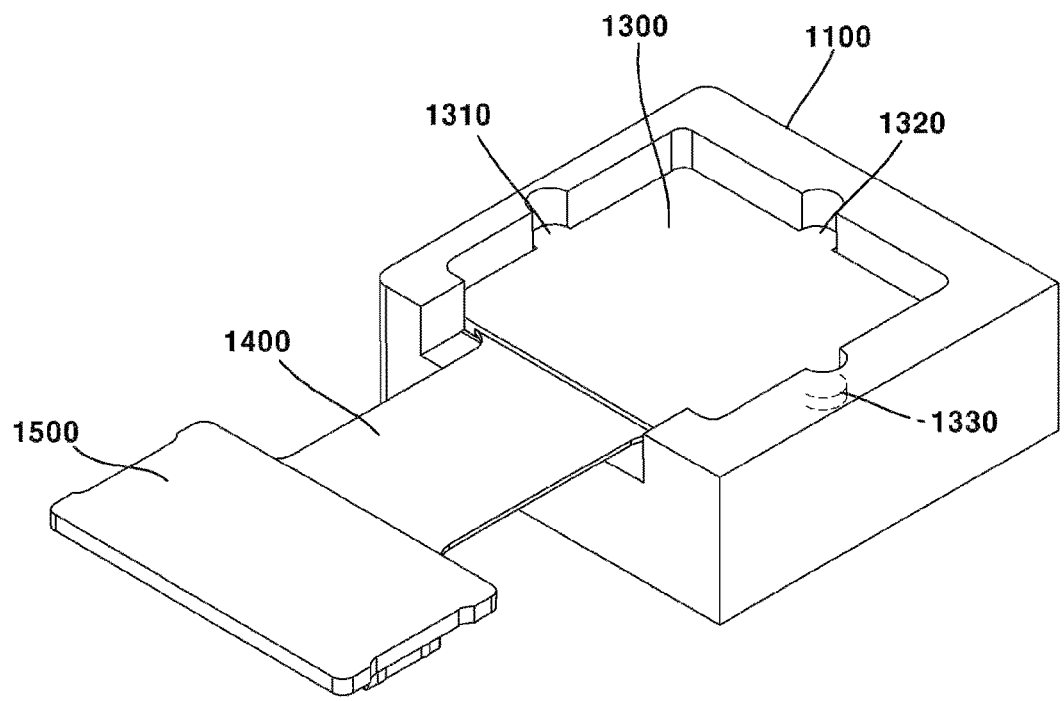

FIGS. 9 to 11 are perspective views of a partial configuration of a camera module according to another embodiment of the present invention.

Referring to FIGS. 9 to 11, the camera module 10 according to another embodiment of the present invention may comprise second protrusions 1310, 1320, and 1330 and fourth grooves 1122, 1124, and 1126. The position of the first substrate 1300 with respect to the first bracket 1100 may be guided through the second protrusions 1310, 1320, and 1330 and the fourth grooves 1122, 1124, and 1126.

The second protrusions 1310, 1320, and 1330 may be formed on lateral surfaces of the first substrate 1300. The second protrusions 1310, 1320, and 1330 may be formed in a number corresponding to the number of the fourth grooves 1122, 1124, and 1126. The second protrusions 1310, 1320, and 1330 may be formed in a shape corresponding to the shape of the fourth grooves 1122, 1124, and 1126. The second protrusions 1310, 1320, and 1330 may be formed in a semicircular shape. The second protrusions 1310, 1320, and 1330 may comprise three second protrusions 1310, 1320, and 1330. The three second protrusions 1310, 1320, and 1330 may be spaced apart from one another. The three second protrusions 1310, 1320, and 1330 may be disposed on the remaining three lateral surfaces of the first substrate 1300 except for the lateral surface disposed in the first region.

The fourth grooves 1122, 1124, and 1126 may be formed in the first bracket 1100. The fourth grooves 1122, 1124, and 1126 may be formed in the first hole 1104 of the first bracket 1100. The fourth grooves 1122, 1124, and 1126 may be formed in the second hole 1120 having a step difference from the first hole 1104 of the first bracket 1100. The second hole 1120 may be formed in a lower region of the first bracket 1100. The fourth grooves 1122, 1124, and 1126 may be formed in a lower region of the first bracket 1100. The fourth grooves 1122, 1124, and 1126 may be formed to be concave on an inner lateral surface of the first bracket 1100. The fourth grooves 1122, 1124, and 1126 may be formed in a semicircular shape. The fourth grooves 1122, 1124, and 1126 may be formed in a shape corresponding to the shape of the second protrusions 1310, 1320, and 1330. The fourth grooves 1122, 1124, and 1126 may be formed in a number corresponding to the number of the second protrusions 1310, 1320, and 1330. The fourth grooves 1122, 1124, and 1126 may comprise three fourth grooves 1122, 1124, and 1126.

According to the camera module 10 according to one and/or another invention of the present invention, the mounting position of the lens modules 1200 and 2200 may be guided to the brackets 1100 and 2100. Through this, the optical axis of the first lens module 1200 and the optical axis of the second lens module 2200 can be aligned at once.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A camera device comprising:
   a first bracket comprising a first hole;
   a second bracket comprising a first groove and connected to the first bracket;

a first camera module disposed on the first hole of the first bracket;

a second camera module disposed on the first groove of the second bracket a first coupling member configured to fix the first camera module to the first bracket and a second coupling member configured to fix the second camera module to the second bracket, wherein a size of the second camera module is smaller than a size of the first groove, wherein the second bracket comprises a first protrusion extending inwardly from an inner lateral surface of the first groove so as to fix the second camera module, wherein the first bracket comprises a step portion formed on an inner lateral surface of the first hole, and a second groove concavely formed on the step portion, wherein the first coupling member comprises a first portion disposed on the step portion and a second portion downwardly extending from the first portion and disposed in the second groove, wherein the second portion of the first coupling member comprises a shape corresponding to a shape of the second groove, wherein the second bracket comprises a first lateral wall, a second lateral wall opposite to the first lateral wall, and a third lateral wall connecting the first lateral wall and the second lateral wall, wherein the second coupling member comprises a first portion disposed between the second camera module and the first lateral wall of the second bracket, a second portion disposed between the second camera module and the second lateral wall of the second bracket, and a third portion disposed between the second camera module and the third lateral wall of the second bracket, wherein a first end of the first portion of the second coupling member and a first end of the second portion of the second coupling member are connected by the third portion of the second coupling member, and wherein a second end of the first portion of the second coupling member and a second end of the second portion of the second coupling member are spaced apart.

2. The camera device of claim 1, wherein the first bracket and the second bracket are integrally formed.

3. The camera device of claim 1, wherein a height of the second bracket is lower than a height of the first bracket.

4. The camera device of claim 1, wherein a shape of the first coupling member is different from a shape of the second coupling member.

5. The camera device of claim 1, wherein a height of the first protrusion is smaller than a height of the first groove.

6. The camera device of claim 1, wherein the first camera module comprises a first substrate, a first image sensor disposed on the first substrate, a first cover member disposed on the first substrate, a first lens disposed in the first cover member and a first flexible substrate extending from the first substrate toward an outside of the first bracket, and wherein the first bracket comprises a third groove formed on a lower surface of the first bracket and penetrated by the first flexible substrate.

7. The camera device of claim 1, wherein the size of the second camera module is smaller than a size of the first camera module.

8. The camera device of claim 6, wherein the first substrate comprises a second protrusion protruding from a lateral surface of the first substrate, wherein the first bracket comprises a fourth groove recessed from the lower surface of the first bracket, and wherein the second protrusion of the first substrate is disposed on the fourth groove of the first bracket.

9. The camera device of claim 1, wherein the first camera module comprises a first substrate, a first image sensor disposed on the first substrate, a first cover member disposed on the first substrate and a first lens disposed in the first cover member, and wherein the first substrate comprises a portion disposed below and overlapped with the first bracket in an optical axis direction of the first camera module.

10. The camera device of claim 1, wherein the second camera module comprises a second substrate, a second image sensor disposed on the second substrate, a second cover member disposed on the second substrate and a second lens disposed in the second cover member, and wherein at least a portion of the second substrate is disposed above and overlapped with the second bracket in an optical axis direction of the second camera module.

11. The camera device of claim 10, wherein each of the first camera module and the second camera module comprises at least one of a first actuator performing an auto focus function and a second actuator performing a hand shake correction function.

12. An optical apparatus comprising:

a main body;

the camera device of claim 1 disposed on the main body; and a display disposed on the main body and outputting an image photographed by the camera device.

13. A camera device comprising:

a bracket comprising a first accommodation portion and a second accommodation portion;

a first camera module disposed on the first accommodation portion of the bracket; and a second camera module disposed on the second accommodation portion of the bracket;

a first coupling member configured to fix the first camera module to the bracket and a second coupling member configured to fix the second camera module to the bracket, wherein the first camera module comprises a first substrate, a first image sensor disposed on the first substrate, a first cover member disposed on the first substrate and a first lens disposed in the first cover member, wherein the second camera module comprises a second substrate, a second image sensor disposed on the second substrate, a second cover member disposed on the second substrate and a second lens disposed in the second cover member, wherein at least a portion of the first substrate is disposed below and overlapped with the bracket in an optical axis direction of the first camera module, wherein at least a portion of the second substrate is disposed on and overlapped with the bracket in an optical axis direction of the second camera module, wherein the first accommodation portion of the bracket comprises a step portion formed on an inner lateral surface of the first hole, and a second groove concavely formed on the step portion, wherein the first coupling member comprises a first portion disposed on the step portion and a second portion downwardly extending from the first portion and disposed in the second groove, wherein the second portion of the first coupling member comprises a shape corresponding to a shape of the second groove,
wherein the second accommodation portion of the bracket comprises a first lateral wall, a second lateral wall opposite to the first lateral wall, and a third lateral wall connecting the first lateral wall and the second lateral wall,
wherein the second coupling member comprises a first portion disposed between the second camera module and the first lateral wall, a second portion disposed between the second camera module and the second lateral wall, and a third portion disposed between the second camera module and the third lateral wall,
wherein a first end of the first portion of the second coupling member and a first end of the second portion of the second coupling member are connected by the third portion of the second coupling member, and
wherein a second end of the first portion of the second coupling member and a second end of the second portion of the second coupling member are spaced apart.

14. The camera device of claim 13, wherein the first accommodation portion comprises a first hole penetrated in the optical axis direction of the first camera module, and
wherein the second accommodation portion comprises a first groove recessed from an upper surface of the bracket.

15. The camera device of claim 14, wherein the bracket comprises a first protrusion extending inwardly from an inner lateral surface of the first groove so as to fix the second camera module.

16. The camera device of claim 14, wherein the first substrate comprises a second protrusion protruding from a lateral surface of the first substrate,
wherein the bracket comprises a fourth groove recessed from a lower surface of the bracket, and
wherein the second protrusion of the first substrate is inserted into the fourth groove of the bracket.

17. The camera device of claim 1, wherein the step portion of the first bracket comprises an upper surface disposed lower than an upper surface of the first bracket, and
wherein the second groove of the first bracket is recessed from the upper surface of the step portion.

18. The camera device of claim 4, wherein the first coupling member is formed by curing a flowable liquid disposed between the first camera module and the first bracket.

19. The camera device of claim 5, wherein at least a portion of the second coupling member is disposed on an upper surface of the first protrusion of the second bracket.

20. The camera device of claim 13, wherein a shape of the first coupling member is different from a shape of the second coupling member.

* * * * *